United States Patent Office
3,463,893
Patented Aug. 26, 1969

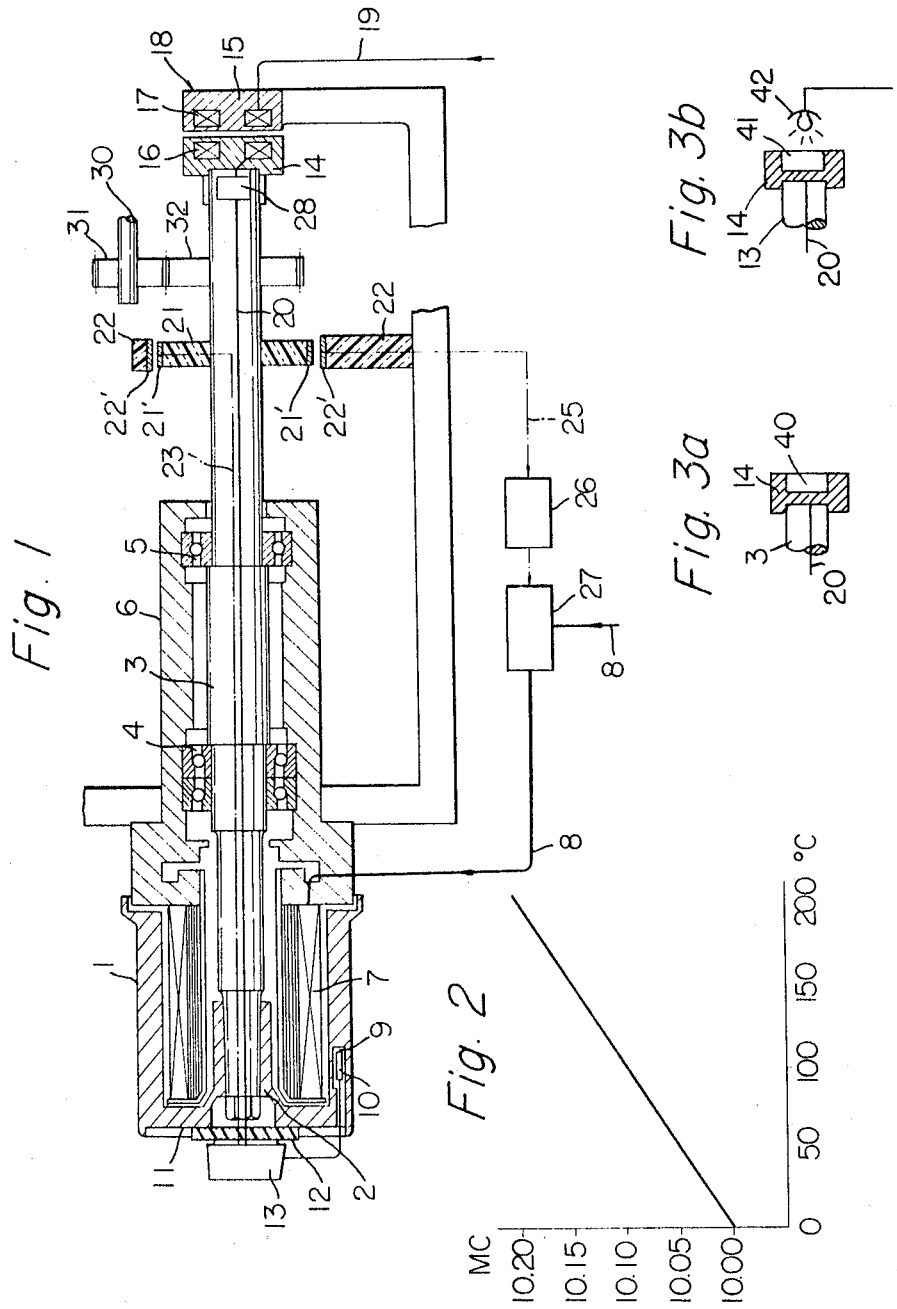

3,463,893
TEMPERATURE CONTROL APPARATUS FOR ROTARY HEATING ROLLER
Masao Chifu, Ibaragi-shi, Japan, assignor to Teijin Limited, Osaka, Japan
Filed Apr. 24, 1967, Ser. No. 633,092
Int. Cl. H05b 5/00, 9/06
U.S. Cl. 219—10.61            13 Claims

ABSTRACT OF THE DISCLOSURE

A temperature controlling apparatus for a heating roller rotatable around a shaft. The roller is equipped with a detector such as a quartz crystal resonator for detecting the temperature of the roller and supplying the detected signal to the controlling device; the input to and output from the detector are electrically coupled respectively to the energy source and the above device without mechanical contact therewith.

---

This invention relates to a temperature control apparatus for a rotary heating roller.

A heated rotary body such as a heating rotary roller is used for transmitting heat from its surface to fibers or films to be processed, and the temperature of the rotary body should be maintained exactly at a predetermined value. The temperature control of such a rotary body has hitherto been carried out in various ways. For instance, one way of maintaining the roller at a predetermined temperature is by electrically measuring the temperature inside the rotary body by means of a thermistor or the like, taking out this measured value as an electric signal from a rotary shaft through slip rings, and operating a control device on the basis of this electric signal. In this method, however, the electric signal taken out is not always constant because of the fluctuation of electric impedance due to contact resistance which is caused by wear of slip rings and the contact point where a brush is in contact with the slip rings, and also by deposition of dust thereon. Thus, there sometimes occurs an error and noise signal, and it is impossible to effect an accurate measurement. On the other hand, in an attempt to get the temperature from a rotary body without any contact, there has been used a method by which a narrow channel is provided concentrically with a shaft on one side of a rotary body, a temperature detecting device such as a thermocouple is inserted in the said channel with care being taken not to bring it into contact with the rotary body, the temperature of the rotary body is transmitted to the thermocouple by means of heat transmission, and thus the electric signal of the thermocouple is used to operate the control device. In such a method, the efficiency of the heat transmission is not good as the thermocouple does not directly contact the rotary body, and a big error occurs in the temperature transmitted when there is even a slight change in the distance between the thermocouple in the channel and the rotary body. Furthermore, if such a device is used for a long time the precision of the spacing between the rotary body and the rotary shaft is mechanically worsened, and the error becomes increasingly worse.

To overcome these defects, an attempt has been made to control the temperature of a rotary body by embedding a temperature detector in the rotary body and constructing a control device integrally with the rotary body, and thereby controlling the detected signal directly at the control device portion. But with such an apparatus, it is impossible to detect the temperature of the rotary body during rotation directly from outside. It is impossible therefore to judge from outside the erroneous movement of the control portion or the deviation from the predetermined temperature. Thus, one cannot see whether or not the temperature of the rotary body is maintained accurately at the predetermined value.

This invention has for its object the provision of a temperature control apparatus having characteristics not obtainable by the prior art by improving the known temperature control apparatuses for a rotary heating roller.

According to the apparatus of this invention, there is provided a converting means for detecting a temperature and generating an electric output in pressure thereto. This takes the form of a heat-sensitive oscillating circuit control element embedded in a rotary heating body such as a roller, and an oscillating circuit connected thereto. The heat-sensitive oscillating circuit control element is an oscillatable element such as a quartz resonator, and the oscillating or oscillator circuit mentioned below is a circuit which includes the oscillating element and an inductive, resistive and/or capacitive circuit. The oscillating circuit control element changes the frequency of oscillation of the circuit with a change in temperature of the roller, and a signal of the change frequency is transmitted from the circuit. Based on this signal, the heating energy source for the roller is controlled. The signal is received from the oscillator circuit containing an oscillating circuit control element rotating together with the roller by means of a magnetic or electrostatic coupling. One of the coupling elements rotates together with the roller, and other element remains stationary. To supply electric energy to the oscillator unit, a low frequency transformer consisting of two elements is used, in which one of two spaced opposed coil-wound iron cores rotates together with the roller and the other remains stationary, the iron cores forming a magnetic circuit. Such a transformer is described in the description as a rotary transformer. Thus, according to the invention, the energy supply and signal output to be converted into temperature are carried out without any mechanical contact with the rotary body through an electric circuit.

Accordingly, the apparatus of this invention is a temperature control apparatus for a rotary heating roller, comprising a rotatable roller secured to a shaft, means disposed between the shaft and the inside surface of the roller and adapted to transmit heat to the said roller, a converting means mounted on the said roller and adapted to detect the temperature of the roller and generate an electric output in response to the detected roller temperature, means for supplying electric energy for conversion from an energy source to the said converting means without mechanical contact, means for transmitting the output generated by the said converting means outside the roller without mechanical contact, and means for controlling a heat transmitting device by the said transmitted signal.

As the said oscillating circuit control element, a quartz resonator is preferable. Other oscillating circuit control elements are also usable, an example of which is a barium titanate electrostatic capacitor to which an inductive coil is connected. A preferred oscillating circuit or unit associated with the oscillating circuit control element for oscillation and to be rotated together with the roller is a known oscillation circuit.

Furthermore, the means for supplying electric energy to the oscillating circuit is not limited to the magnetic coupling of the afore-mentioned rotary transformer, but can be a capacitive coupling in which one member is rotated together with the shaft and the other is fixed. Also, the supply of energy can be effected by an electric source made by fixing or embedding a battery in a rotary body containing a shaft. It may also be effected by supplying light energy to a solar battery secured to the outer periphery of the rotating portion.

The invention will now be described with reference to the accompanying drawings in which:

FIG. 1 is an elevation view of the apparatus of this invention, in which the rotating roller portion is shown in longitudinal cross section and the control circuit associated with the roller is shown as a block diagram; FIG. 2 is a graph showing the relation between the temperature of a quartz crystal resonator and the oscillating frequency thereof used in this invention; FIGS. 3a and 3b are partial sectional views showing a modified form of the apparatus.

The reference numeral 1 designates a cup-like heating roller having a boss 2 mounted on the end portion of rotary shaft 3. Shaft 3 is rotatably mounted on supporting frame 6 in bearings 4 and 5. Induction heating coil 7 is mounted on a portion of one end of the supporting frame which faces the inside surface of roller 1, and is adapted to be supplied with electric energy via control device 27 from an electric source (not shown) through conductor 8. Temperature detecting oscillating circuit control element 10 is embedded in notched portion 9 of roller 1, and is connected electrically to oscillating circuit 13 secured to heat-insulating material 12 on the bottom 11 of the roller to control the frequency of oscillation of the circuit. It is preferred that said temperature detecting element 10 be a quartz crystal resonator the oscillating frequency of which varies in response to the change in temperature, but other elements can be used if they cause a change in frequency, electric resistance, dielectric constant, magnetic permeability, and other electric output values with a change in temperature. The supply of electric energy to the said oscillating circuit is through a rotary transformer 18 having windings 16 and 17 in a cup-like core 14 secured to the other end of rotary shaft 3 and having an E-shaped section when seen in axial section, and a fixed cup-like core 15 opposed thereto and concentric therewith and having the same shape. In this transformer, a magnetic circuit is formed by the two opposed cores across the air gap between them. It is possible therefore to take out energy from one winding 16 by supplying AC to the other winding 17 from an electric source (not shown) via conductor 19. This energy is supplied via a rectifier 28 to the oscillating circuit by conductor 20 which extends through the shaft 3. The elements 16 and 17 can also be capacitive elements for transmission of power to the oscillating circuit.

A coupling apparatus having a metallic ring 21′ provided at the periphery of a collar 21 is secured to shaft 3 and is rotated together therewith and is electrostatically coupled with non-rotatable metallic ring 22′ provided inside hollow body 22 concentric with said ring 21′. This apparatus is used to transmit the signal generated in the oscillating circuit. Inside ring 21′ is electrically connected to the said oscillating circuit 13 by conductor 23.

When the apparatus of this invention is driven by means of a driving device attached to shaft 3, for instance, driving shaft 30, gears 31 and 32, while power is being supplied to coil 7 from conductor 8, roller 1 is heated by induction during its rotation. The roller is used for heat-treatment of synthetic fibers wound around the roller and which are being drawn or heat-set. The temperature of the roller is detected by element 10 which controls the frequency of oscillation of the oscillating circuit 13 connected to the element 10. Because the oscillation frequency of the element changes in response to the temperature change as shown in FIG. 2, the output of oscillating circuit 13 corresponds to the roller temperature. This output is taken out without mechanical contact with the rotating parts of the roller by means of electrostatic couplings 21′ and 22′, and supplied to control circuits 27 by conductor 25 through amplifier and/or frequency discriminator 26 whereby it is possible to control the temperature of the heating electric source.

Since according to this invention, the supply of electric energy to the rotating oscillating circuit and the transmission of the oscillating output from the oscillating circuit can be carried out without mechanical contact, there is no resistance incident to the physical contact of contact elements at the time of incoming and outgoing of electric energy to and from the rotary body, especially outgoing electric energy. Thus, there is no noise in the output signal incident to such physical contact. The reliability of the output signal is high and the control device can be actuated so as to effect temperature control precisely. Furthermore, because the output signal frequency received at coupling 22 directly indicates the temperature of the roller, it is possible to read off the temperature of the roller during operation.

The supply of energy to the oscillating circuit is by means of a rotary transformer. Accordingly, there is an electrical connection but no mechanical connection. Since such conventional means as slip rings is not used, there is no mechanical contact and maintenance and inspection are easy.

Alternatively, the supply of power to the oscillating circuit can be from battery means, such as a battery 40 embedded in core 14, as shown in FIG. 3a, or a solar battery 44 in core 14 on which light is directed by light source 42, as shown in FIG. 3b.

The oscillating circuit containing the element 10 is not necessarily limited to one having a quartz crystal oscillating element. It may be replaced by a circuit containing an element consisting of barium titanate and an inductive coil, or an oscillating circuit containing a thermistor, or other element in which the frequency, voltage, resistance, dielectric constant, magnetic permeability or other electrical output value changes with a change in temperature, for instance a semi-conductor resistance element, semi-conductor capacitance element or ferrite core.

What is claimed is:

1. A temperature control apparatus for a rotary heating roller, comprising a shaft, a rotatable roller secured to said shaft, heating means disposed between the shaft and the inside surface of the roller and adapted to transmit heat to the said roller, a converting means on the said roller and adapted to detect the temperature of the roller and generate an electric output in response to the detected roller temperature, a first contactless coupling means having one member on said shaft and coupled to said converting means and supplying electric energy for conversion from an energy source to the said converting means, a second contactless coupling means having one member on said shaft and coupled to said converting means and transmitting the output generated by the said converting means outside the shaft, and control means coupled between said second contactless coupling means and said heating means for controlling said heating means by the said transmitted output.

2. An apparatus as claimed in claim 1 wherein the said first contactless coupling is a rotary transformer, the one member of which is a transformer winding mounted on the rotary shaft and having a stationary transformer winding adjacent thereto and coupled therewith electromagnetically for forming a closed magnetic circuit in association with the said first-mentioned transformer winding.

3. An apparatus as claimed in claim 1 wherein the said first contactless coupling has as said one member a capacitor element secured to the rotary shaft and adapted to be rotated together therewith and further has a stationary capacitor element coupled therewith electrostatically which forms a capacitor in association with the said first-mentioned capacitor element.

4. An apparatus as claimed in claim 1 wherein the said second contactless coupling means has as said one member a coupling element and has another stationary coupling element positioned around said shaft and electrostatically coupled with the said first-mentioned element.

5. An apparatus as claimed in claim 1 wherein the said second contactless coupling has as said one member a coupling element and has another stationary coupling element positioned around said shaft and coupled electromagnetically with said first-mentioned element.

6. An apparatus as claimed in claim 1 wherein the said converting means consists of an oscillating circuit containing a quartz crystal resonator embedded in the roller.

7. An apparatus as claimed in claim 1 wherein the said converting means consists of an oscillating circuit containing a barium titanate electrostatic capacitor embedded in the roller.

8. An apparatus as claimed in claim 1 wherein the said converting means consists of an oscillating means containing a semi-conductor element embedded in the roller.

9. An apparatus as claimed in claim 1 wherein the said converting means consists of an oscillating circuit containing a semi-conductor capacitance element embedded in the roller.

10. An apparatus as claimed in claim 1 wherein the said converting means consists of an oscillating circuit containing a thermistor embedded in the roller.

11. An apparatus as claimed in claim 1 wherein the said converting means consists of an oscillating circuit containing a ferrite core induction element embedded in the roller.

12. A temperature control apparatus for a rotary heating roller, comprising a rotatable roller secured to a shaft, heating means disposed between the shaft and the inside surface of the roller and adapted to transmit heat to the said roller, a converting means on the said roller and adapted to detect the temperature of the roller and generate an electrical output in response to the detected roller temperature, a rotary member on said shaft, battery means in said rotary member and coupled to said converting means for supplying electric energy for conversion to the said converting means, a contactless coupling means having a member on said shaft coupled to said converting means and transmitting the output generated by the said converting means, and control means coupled between said coupling means and heating means for controlling the heating means by the said transmitted output.

13. A temperature control apparatus as claimed in claim 12 wherein said battery means is a solar battery and said apparatus further comprises a source of light directed against said rotary member for energizing said solar battery.

References Cited

UNITED STATES PATENTS 3,187,150   6/1965   France _____ 219—10.61

JOSEPH V. TRUHE, Primary Examiner

L. H. BENDER, Assistant Examiner

U.S. Cl. X.R.

219—10.75